(12) United States Patent
Nielsen

(10) Patent No.: US 11,181,096 B2
(45) Date of Patent: Nov. 23, 2021

(54) CONTROL METHOD FOR A WIND TURBINE

(71) Applicant: VESTAS WIND SYSTEMS A/S, Aarhus N (DK)

(72) Inventor: Johnny Nielsen, Svenstrup J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 222 days.

(21) Appl. No.: 16/063,427

(22) PCT Filed: Dec. 22, 2016

(86) PCT No.: PCT/DK2016/050462
§ 371 (c)(1),
(2) Date: Jun. 18, 2018

(87) PCT Pub. No.: WO2017/108063
PCT Pub. Date: Jun. 29, 2017

(65) Prior Publication Data
US 2018/0363625 A1    Dec. 20, 2018

(30) Foreign Application Priority Data

Dec. 23, 2015 (DK) .......................... PA 2015 70869

(51) Int. Cl.
*F03D 7/02* (2006.01)
*F03D 17/00* (2016.01)

(52) U.S. Cl.
CPC ........... *F03D 7/0204* (2013.01); *F03D 17/00* (2016.05); *F05B 2270/32* (2013.01);
(Continued)

(58) Field of Classification Search
CPC ...... F03D 7/0204; F03D 7/0224; F03D 17/00; F03D 7/02; F05B 2270/32;
(Continued)

(56) References Cited

U.S. PATENT DOCUMENTS 7,550,862 B2 *  6/2009  Altemark ............... F03D 7/042
                                                      290/44
7,939,961 B1 *  5/2011  Bonnet ................ F03D 7/0204
                                                      290/55
(Continued)

FOREIGN PATENT DOCUMENTS

CN     102536655 A    7/2012
CN     102777322 A    11/2012
(Continued)

OTHER PUBLICATIONS

PCT International Search Report for Application No. PCT/DK2016/050462 dated Dec. 22, 2016.
(Continued)

*Primary Examiner* — Igor Kershteyn
*Assistant Examiner* — Joshua R Beebe
(74) *Attorney, Agent, or Firm* — Patterson + Sheridan, LLP

(57) ABSTRACT

Controlling a wind turbine comprising a wind direction sensor, a yawing system, and a control system for turning the wind turbine rotor relative to the wind. Over one or more time intervals a data set comprising a direction of the wind relative to the wind turbine as measured by the wind direction sensor and a wind power parameter determined as one of a power, a torque, or a blade load of the wind turbine are obtained. The data sets are sorted into a number of bins of different intervals of wind power parameter. or each power bin, a statistical representation of the wind power parameter as a function of the relative wind direction is determined and then used in estimating a wind direction offset corresponding to the relative wind direction where the wind power parameter attains a peak value. The relative wind direction is then adjusted as a function of the set of
(Continued)

wind direction offsets to yield more accurate wind direction data which can be used in controlling the turbine.

17 Claims, 6 Drawing Sheets

(52) U.S. Cl.
CPC ... *F05B 2270/321* (2013.01); *F05B 2270/329* (2013.01); *F05B 2270/802* (2013.01); *Y02E 10/72* (2013.01)

(58) Field of Classification Search
CPC .......... F05B 2270/321; F05B 2270/329; F05B 2270/802; F05B 2200/30; Y02E 10/723
See application file for complete search history.

(56) References Cited

U.S. PATENT DOCUMENTS

| | | |
|---|---|---|
| 2007/0035135 A1 | 2/2007 | Yoshida |
| 2009/0146424 A1* | 6/2009 | Kammer ............... F03D 7/0224 290/44 |
| 2011/0101691 A1 | 5/2011 | Hashimoto et al. |
| 2011/0215576 A1 | 9/2011 | Minami et al. |
| 2012/0139248 A1* | 6/2012 | Bertolotti .............. F03D 7/0204 290/44 |
| 2013/0099497 A1* | 4/2013 | Bowyer .................. F03D 7/042 290/44 |
| 2013/0149146 A1* | 6/2013 | Sasseen ................ F03D 7/0204 416/1 |
| 2015/0086357 A1* | 3/2015 | Gregg ..................... F03D 7/046 416/1 |
| 2016/0076517 A1* | 3/2016 | Butterworth ............ F03D 17/00 416/1 |
| 2017/0268484 A1* | 9/2017 | Li .......................... F03D 7/0204 |

FOREIGN PATENT DOCUMENTS

| | | |
|---|---|---|
| CN | 103026059 A | 4/2013 |
| DE | 102009015167 A1 | 9/2010 |
| WO | 2017108063 A1 | 6/2017 |

OTHER PUBLICATIONS

First Technical Examination for Application No. PA 2015 70869 dated Jul. 1, 2016.
PCT Written Opinion of the International Searching Authority for Application No. PCT/DK2016/050462 dated Dec. 22, 2016.
Chinese Office Action for Application No. 201680079744.4 dated May 10, 2019.

* cited by examiner

CONTROL METHOD FOR A WIND TURBINE

FIELD OF THE INVENTION

The present invention relates to a method of controlling a wind turbine, the wind turbine comprising a wind direction sensor, wind turbine blades attached to a rotor hub, a yawing system, and a control system for yawing the wind turbine rotor relative to the wind with the aim of controlling the wind turbine optimally under different and changing wind directions. The invention furthermore relates to control system for performing the control method and a wind turbine comprising such control system.

BACKGROUND

Most modern wind turbines are controlled and regulated continuously with the purpose of ensuring maximum power extraction from the wind under the current wind and weather conditions, while at the same time ensuring that the loads on the different components of the wind turbine are at any time kept within acceptable limits.

In order to optimize the power production and reduce the loads of the turbine it is important to know the right relative wind direction of the free flow wind. Most often the wind direction is measured by a wind direction sensor such as a wind vane placed on top of the nacelle and the wind turbine rotor is then continuously yawed to face the wind. If the wind direction measurements are off even by one or a few degrees, the resulting misalignment of the turbine rotor may cause increased and different loadings on the wind turbine blades than anticipated, and thereby increased wear and fatigue on the blades, blade root connections, bearings etc. Further, a misalignment of the turbine rotor causes a non-negligible reduction in the power production over time.

The measurements from a wind direction sensor may however far from always be accurate for one reason because the rotor disturbs the free flow wind before reaching the wind sensor. This also means that the inaccuracy of the wind direction sensor depends of the way the rotor is operated, i.e. on the pitch angles, and on the rotational speed of the rotor, and thereby also changes indirectly as a function of the wind speed.

One way to compensate for this problem is by calibrating the wind vane measurements by a basic set of Wind Correction Parameters (WCP). These parameters are typically found on a prototype turbine by comparing the measurements from the wind sensors on the turbine with measurements from a nearby Met Mast. Such measurement campaign however will take several weeks. Further, before the measurement campaign can be started, the wind sensor needs to be aligned with the main shaft of the turbine. This is done with as special alignment tool. The Wind Correction Parameters found on the prototype can then be used on all the wind turbines of the same type. So in order to comply with the found Wind Correction Parameters a wind sensor needs first to be aligned exactly in the same way as on the prototype turbine to get the right wind direction measurement. This alignment is both time consuming and not always accurate, when carried out in 100 m height. Furthermore, the wind sensors may sometimes need to be realigned after some time due to wear, bolts being worked loose over time etc.

It has also been found that these Wind Correction Parameters do not fit the individual turbines across the fleet very well. The actual airflow around a wind sensor will change from turbine to turbine, from site to site, and also change on the same turbine during a year. Furthermore, making changes or modifications to for example the wind turbine blades, the nacelle roof, or a cooler top on the nacelle have been seen to cause changes to the airflow around the wind sensors thereby making the Wind Correction Parameters less accurate.

In some methods, like disclosed in US2010/0066087, correction parameters are obtained from distribution curves of the output power of the turbine versus the wind direction deviation established at each incoming wind speed. The wind directions measured at the anemoscope are then at each incoming wind speed calibrated by a corresponding correction parameter.

The dependency of the wind speed, however, makes the calibration method much more complex. More importantly, however, such calibration method has shown to be very sensitive to fluctuating or fast changing wind speeds. Also, the dependency of the wind speed has shown to be problematic, as the measured or determined wind speed may in itself be inaccurate and needs to be calibrated especially as a function of misalignment relative to the wind direction. The use of the wind speed in calibrating the wind direction thereby unavoidably renders the calibration method inaccurate.

OBJECT OF THE INVENTION

It is an object of embodiments of the present invention to provide a control method for a wind turbine which obviate or reduce some of the above mentioned problems in known controlling methods.

It is therefore an object of embodiments of the present invention to overcome or at least reduce some or all of the above described disadvantages of the known wind direction measurements by providing a wind turbine controlling method of improved yawing and reduced risk of misalignment of the wind turbine rotor.

A further object of embodiments of the invention is to provide a more robust yet effective method to calibrate measurements from an existing wind direction sensor with reduced sensitivity to fluctuating or fast changing wind speeds.

A further object of embodiments of the invention is to provide a wind direction calibration method with improved accuracy.

It is a further object of the invention to provide a control method for a wind turbine increasing the annual energy production (AEP) of the wind turbine while preferably reducing the fatigue loading or wear on the turbine due to misalignment of the rotor in the wind.

It is a further object of embodiments of the invention to provide a method of improving the wind direction measurements obtained by conventional wind direction sensors and to provide a method of calibrating measurements from a wind direction sensor which may be implemented on existing equipment.

A further object of embodiments of the invention is to provide a method to calibrate measurements from an existing wind direction sensor without the need of physically adjusting the sensor and without the need of comparative measurements from a nearby Met Mast.

So, in a first aspect the present invention relates to a method of controlling a wind turbine, the wind turbine comprising a wind direction sensor, a yawing system, and a control system for turning the wind turbine rotor relative to the wind, and where the method comprises:

pre-setting a number of intervals of a wind power parameter, the wind power parameter determined as one of a power, a torque, or a blade load of the wind turbine;

obtaining at time intervals a data set comprising a direction of the wind relative to the wind turbine as measured by the wind direction sensor and a wind power parameter;

obtaining over time a group of data sets for each wind power parameter interval;

determining for each wind power parameter interval a statistical representation of the wind power parameter as a function of the relative wind direction based on the group of data sets for that interval;

estimating for each wind power parameter interval and each statistical representation a wind direction offset of that interval, the wind direction offset corresponding to the relative wind direction where the wind power parameter attains a peak value;

adjusting the relative wind direction as a function of the wind direction offset of the different wind power parameter intervals;

determining a control parameter of the wind turbine as a function of the adjusted relative wind direction; and controlling the wind turbine according to the control parameter.

Hereby is obtained a simple yet effective control method improving the determination of the wind direction relative to the wind turbine and reducing the risk of misaligning the rotor relative to the wind, as the control parameter is based on adjusted or calibrated wind direction measurements.

Furthermore is obtained a simple and effective control method for increasing the performance such as the annual energy production (AEP), as the control parameter is determined based on the adjusted wind direction measurements whereby is obtained a better alignment of the rotor to the wind as actually experienced by the rotor. Also, the wind turbine is better protected as a more precise alignment of the rotor to the free wind generally results in better control of the loads on the wind turbine blades and reduced wear on components.

It has been found that the wind direction measurements used to determine the optimal orientation of the wind turbine can advantageously be adjusted based on a wind direction offset determined from the proposed method. The wind direction offset is established by observing over time the wind power parameter obtained by the turbine at different relative wind directions and for different intervals of the wind power parameter. The algorithm will for each interval find the relative wind direction corresponding to a peaking power parameter and use these relative wind directions as a set of wind direction offsets. The wind direction offsets determined according to this method has proven to be a good and effective measure for the misalignment of the wind direction sensor taking into account and capturing that the wind direction measurements are affected also by the rotor operation and therefore varies in dependency of the wind speed.

By determining a wind direction offset parameter for a number of intervals of the wind power parameter is obtained a more precise method with improved accuracy better capturing that the wind direction is to be adjusted differently under different operating condition of the wind turbine and under different wind speeds. However, the set of wind direction offset parameters are advantageously determined for different wind power parameter intervals thereby avoiding the need for determining or measuring the wind speed. Hereby is obtained a correction method insensitive to fluctuating or fast changing wind speeds or to inaccurate wind speed measurements or estimations, which may otherwise be a problem in some control methods. Often, the wind speed measurements in themselves are inaccurate due to for example a misalignment or rotor effects. Therefore, being able to correct the wind direction measurements without the need for the wind speed improves the accuracy of the wind direction determination significantly.

In an embodiment, the statistical representations are determined completely independently of the wind speed, i.e. without the use of wind speed measurements or estimations.

The control parameter may preferably by a yawing parameter for the wind turbine and the controlling of the wind turbine then comprises yawing the wind turbine according to the yawing parameter. Hereby the yawing parameter of the turbine is based on more accurate wind direction data improving the control of the wind turbine.

The control parameter may alternatively or additionally comprise other control parameters which to some extend depends on the wind direction relative to the wind turbine, such as power control, or up- and/or down-rating of the nominal power.

The wind power parameter is determined as either the wind turbine power or a torque or a blade load on the wind turbine which parameters all reflect the energy extracted from the wind by the wind turbine. The wind turbine power may advantageously be determined as the produced power or the grid output power which is easily detected, or as the generator power. The torque may be determined for example on the main shaft, and may be measured or determined from other wind turbine parameters as known in the field. The blade loads may be determined as a blade root moment or as an average of the blade root moments or as measured from sensors such as strain gauges or optical sensors placed on one or more of the blades.

A number of statistical representations are established, one for each of the predetermined wind power parameter intervals. One wind direction offset is then estimated from each statistical representation and the wind direction is then adjusted based as a function of the set of wind direction offset parameters. Hereby is obtained a set of wind direction offsets corresponding to different wind power parameters for thereby more accurately capturing how the wind direction sensor measurements are often seen to vary at different rotor speeds or rotor configuration (for example pitch angles). By determining and applying a number of wind direction offsets the wind direction can be determined more accurately.

The statistical representations for different wind power parameter intervals or wind power bins may be determined individually for example over different time periods or in parallel. One statistical representation for one wind power parameter interval may be ready and applicable earlier than the others depending on the wind conditions.

The predetermined intervals for the wind power parameter are preferably successive intervals but some may alternatively in an embodiment be partially overlapping. The intervals may be determined for example with a view to the dependency of the wind direction misalignment to the wind power parameter, such that smaller intervals are set in regimes where the wind direction correction changes more.

In an embodiment, 2, 3, 4, 5, 6, 7, or 8 different statistical representations are made based on wind power parameters within 2, 3, 4, 5, 6, 7, or 8 wind speed intervals, respectively. The more intervals the more refined the wind direction correction may be.

The statistical representations may be established as histograms reflecting for each relative wind direction the average wind power parameter detected at that relative wind direction. A statistical representation thereby over time yields a probability distribution of the wind power parameter as a function of the relative wind directions and for the associated wind power parameter interval.

The obtained data sets may be stored or may be used in each time step just to update the statistical representation.

A data set of a determined wind power parameter and a measured relative wind direction may be averaged over a relatively short period of time such as e.g. 30 seconds to hereby reduce influence by turbulence etc.

For each wind power parameter interval, a wind direction offset is then extracted from the data sets associated to the power interval and from the statistical representation as the wind direction yielding a peak value of the wind power parameter. The peak value may be determined as a maximum or a minimum. If the wind power parameter is the power or the torque of the wind turbine, the peak value is a maximum. If the wind power parameter is a blade load, the peak value can be either a minimum or a maximum depending on which loads are used.

The wind direction offset may then advantageously be used to adjust the relative wind direction corresponding to having calibrated the wind direction sensor. The relative wind direction is adjusted as a function of the set of wind direction offsets, such as by a simple subtraction, by a linear function or some other functions. Likewise the adjustment may be performed by a PI or PID control.

The method may be performed by adjusting the relative wind direction by adaptive wind direction parameters prior to estimating the statistical representation. The adaptive wind direction parameters are thereafter updated as a function of the wind direction offsets and potentially as a function of earlier adaptive wind direction parameters. The relative wind direction is then adjusted by the updated adaptive wind direction parameters. The method according to this, is essentially the same, only the data handling and the parameters to be stored may be different.

The proposed method may advantageously be used to adaptively find the misalignment of a wind direction sensor on any individual wind turbine and without use of or the need for any special tools or man power for performing a physical calibration.

Also, the method according to the invention will advantageously calibrate the measurements from the wind direction sensor automatically compensating for any changes made on the turbine affecting the airflow around the sensors, like for instance if other sensors or aviation lights are placed close to the wind sensors, without the need for any information on the cause of the changes.

The wind direction offset for the wind direction measurements may be determined initially a first time on any new wind turbine after having been erected, but may likewise be re-estimated later at other times during the lifetime of the wind turbine for example at fixed time intervals such as a number of times every year, or at special times when requested, or may be re-iterated on and re-estimated at regular intervals or continuously.

For example, the method according to the invention can be performed and an updated wind direction offset estimated whenever work or maintenance has been performed on the nacelle thereby ensuring that any changes potentially affecting the measurements from the wind direction sensors would be taken into account.

Also, the wind direction offset can be re-established a number of times each year thereby catching and taking into account the seasonal variation in the airflow around the wind sensors which also affects the wind direction measurements. Such seasonal variations may for example be caused by temperature and/or density changes, and changes to the vegetation around the wind turbine such as leaves on the trees.

Depending on the amount of data and the number of data sets used in the statistical representations, some or all of the wind direction offsets can be obtained as a rough estimate relatively quickly or can be determined based on more extensive data material. Hereby, the wind direction offset can be obtained relatively quickly if desired (for example as a first calibration parameter on a new turbine or after maintenance work on the nacelle) or can be determined more slowly and more accurately for finer adjustments.

Further, the adjustments are in an embodiment implemented in a slow control loop whereby the wind turbine continuously optimizes the alignment to compensate for the small changes that can occur over time.

The control method may be implemented on new or existing wind turbines as pure software implementation with no need for any additional hardware on the turbine or may be implemented as a combination of software and hardware.

The data sets may be obtained at time intervals of fixed length such as every minute, a number of times every second or every minute, every hour or every day. Preferably a data set is obtained at each sample such as several times per second. Short intervals are advantageous in reducing the risk of obtaining the data during a yaw operation where the data may in some cases potentially be cluttered.

In an embodiment of the invention, the relative wind direction is adjusted as a function of the wind direction offset estimated from the statistical representation of the interval comprising the wind power parameter at the time of adjusting. In this way the wind direction offset of one statistical representation then is simply applied to adjust all relative wind directions when the actual wind power parameter lies within the interval of that statistical representation.

In an embodiment of the invention, the method according to the above further comprises estimating a wind direction offset for each interval of wind power parameter, and wherein the relative wind direction is adjusted by using an interpolation between the wind direction offsets of the different intervals. In this way the accuracy of the applied wind direction offset parameter to adjust the relative wind direction is further improved.

In an embodiment of the invention, a data set is disregarded when determining the statistical representations, if the determined wind power parameter is above a first wind power threshold. This first wind power threshold may be equal to the nominal power of the wind turbine, or to some power reference related to the nominal power, or a combination of both. Hereby only data obtained during partial load operation of the wind turbine when the power of the wind turbine is below a first wind power threshold will be used in the determination of the wind direction offsets. During partial load operation where the wind turbine power is below the nominal power the wind turbine is operated primarily with a view to maximize the power production. Thus only data sets of a wind power parameter and a corresponding measured relative wind direction are considered when occurring in the partial load regime. Hereby the data observations from full load operation where the wind power is always approximately equal to the nominal power (potentially derated or uprated to some reference power) are not taken into account in the statistical representations whereby the determination of the wind direction offsets becomes more accurate and closer to the actual misalignment of the wind direction sensor.

In an embodiment of the invention and as mentioned in the above, the first wind power threshold corresponds to a factor times a nominal power of the wind turbine, the factor being in the interval of 0.5-1.2, such as in the range of 0.7-0.95. Hereby the control method takes into account if the wind turbine is operated at partial or at full load. Furthermore the control method advantageously takes into account any present derate or uprate of the wind turbine where the nominal power is modified either down or up for example during unstable or particularly favourable wind conditions, respectively. In an embodiment the first wind power threshold corresponds to a factor times a power reference of the wind turbine. Normally the power reference is the same as the nominal power, but in some situations the power reference is lower or higher than the nominal power. For example if a defect on a blade load sensor has been registered, the power reference may be reduced to 0.8 times the nominal power regardless of the current power production.

In a further embodiment of the invention a, when determining the statistical representation, a data set is disregarded if the determined wind power parameter is lower than a second wind power threshold. Likewise data sets may be disregarded if obtained at a wind speed below some relatively low wind speed threshold. By not using data sets obtained at very low wind speeds (and at correspondingly low power) is obtained a more accurate wind direction offset.

The second wind power threshold may in an embodiment correspond to a factor times a nominal power of the wind turbine, the factor being in the interval of 0.05-0.2, thus reflecting a relatively low wind power production and a low wind speed.

The statistical representation of a wind power parameter interval is in an embodiment determined over a predetermined time period such as over one week or a preset number of days. The length of the time period may alternatively or additionally be set in dependence of other parameters such as for example the time of year, the general weather conditions, the desired accuracy of the wind direction offset or the time since the last estimation of a wind direction offset.

In an embodiment of the invention, the statistical representation of a wind power parameter interval is determined based on a predetermined number of data sets in the group of data sets for that wind power parameter interval. Hereby is ensured that the wind direction offset is obtained based on a sufficiently large number of data in order to ensure a sufficient or a certain desired quality of the estimation of the wind direction offset. Further is ensured that the statistical representation is based on a sufficient amount of data which under some weather conditions may take longer time to obtain or may under some weather conditions be obtained faster than expected.

In a further embodiment, the statistical representation of a wind power parameter interval is determined based on at least a predetermined number of data sets within at least one predetermined interval of relative wind direction, such as in an interval of)[(−6°)-(−4°)], [(−1°)-1°] and/or [4°-6°]. Hereby is ensured that the wind direction offset is obtained based on a certain amount of relevant data thereby increasing the quality of the method. The wind direction offset may typically be around +/−10 degrees and therefore the statistical representation may advantageously be based at least on a certain number of data of relative wind directions within one or more of intervals also within +/−10 degrees such as within one or more of the above mentioned intervals.

According to a further embodiment of the invention, the steps of obtaining a data set and determining a statistical representation are repeated at time intervals. I.e. a new updated wind direction offset may be determined at time intervals, such as more or less continuously, after a week or a month from the last determination, or upon request, or after every shut down of the wind turbine, or combinations hereof.

As also mentioned previously, in one embodiment the determining of a power comprises measuring a grid power or measuring or estimating a generator output power. The wind power parameter may hereby be obtained as the grid power which is normally a parameter already available.

In an embodiment, determining the blade load comprises determining a root moment of one or more of the wind turbine blades. The blade load may for example be expressed as average blade root moment. Alternatively or additionally, the blade load may be determined from measurements on one or more of the turbine blades by means of strain gauges or optical fibre sensors.

According to embodiment of the invention, the adjusting of the relative wind direction comprises subtracting the wind direction offset times a gain factor smaller than one, wherein the gain factor is the interval of 0.1-0.95, such as in the interval of 0.4-0.6, such as equal 0.5. Hereby too abrupt changes to the yawing are avoided and an improved convergence may be obtained.

In yet a further embodiment of the invention, the relative wind direction is further adjusted as a function of earlier wind direction offsets, whereby abrupt changes to the relative wind direction may be avoided and whereby switching back and forth between values may likewise be avoided. For example, the relative wind direction may be adjusted by a subtraction of the wind direction offset, and further a subtraction of the change in wind direction offset from the last to the present adjustment and times a gain factor.

In an embodiment of the invention, the method further comprises correcting the relative wind direction as measured by the wind direction sensor according to a predefined set of wind correction parameters. Hereby the relative wind direction measurement may initially be corrected based on a fixed pre-defined set of correction parameters for example taking into account any general physical misalignment of the wind direction sensor, any calibration parameters as for example provided by the sensor manufacturer etc. This additional step simply means that the relative wind direction is most likely at least a little more correct before estimating the statistical representations and that the wind direction offsets are most likely correspondingly smaller.

The control method according to any of the preceding for establishing a set of wind direction offsets preferably during partial load operation may on some times or always be combined with other methods of adjusting the relative wind direction. For example with a method for determining a wind direction offset based on parameters preferably detected and gathered during full load operation of the wind turbine, i.e. at higher wind speeds above a nominal wind speed where the wind turbine is generally operating at nominal or approximately nominal power (optionally derated or uprated) and the turbine is controlled with a view to minimize the loads on the turbine. In one embodiment, the relative wind direction may then be adjusted based on one (or more) wind direction offset(s) during partial load operation and based on another (or more) wind direction offset(s) determined differently during full load operation.

In a further aspect the present invention relates to a control system for a wind turbine configured to perform the steps of:

pre-setting a number of intervals of a wind power parameter, the wind power parameter determined as one of a power, a torque, or a blade load of the wind turbine;

obtaining at time intervals a data set comprising a direction of the wind relative to the wind turbine as measured by the wind direction sensor and a wind power parameter;

obtaining over time a group of data sets for each wind power parameter interval;

determining for each wind power parameter interval a statistical representation of the wind power parameter as a function of the relative wind direction based on the group of data sets for that wind power parameter interval;

estimating for each wind power parameter interval and each statistical representation a wind direction offset of that wind power parameter interval, the wind direction offset corresponding to the relative wind direction where the wind power parameter attains a peak value;

adjusting the relative wind direction as a function of the wind direction offset of the different wind power parameter intervals;

determining a control parameter of the wind turbine as a function of the adjusted relative wind direction; and controlling the wind turbine according to the control parameter.

In a further aspect the present invention relates to a wind turbine comprising a control system according to the above.

The advantages of the control system and the wind turbine comprising such control system are as described in relation to the control method in the previous.

BRIEF DESCRIPTION OF THE DRAWINGS

In the following different embodiments of the invention will be described with reference to the drawings, wherein.

DETAILED DESCRIPTION OF THE DRAWINGS

Figure 1:
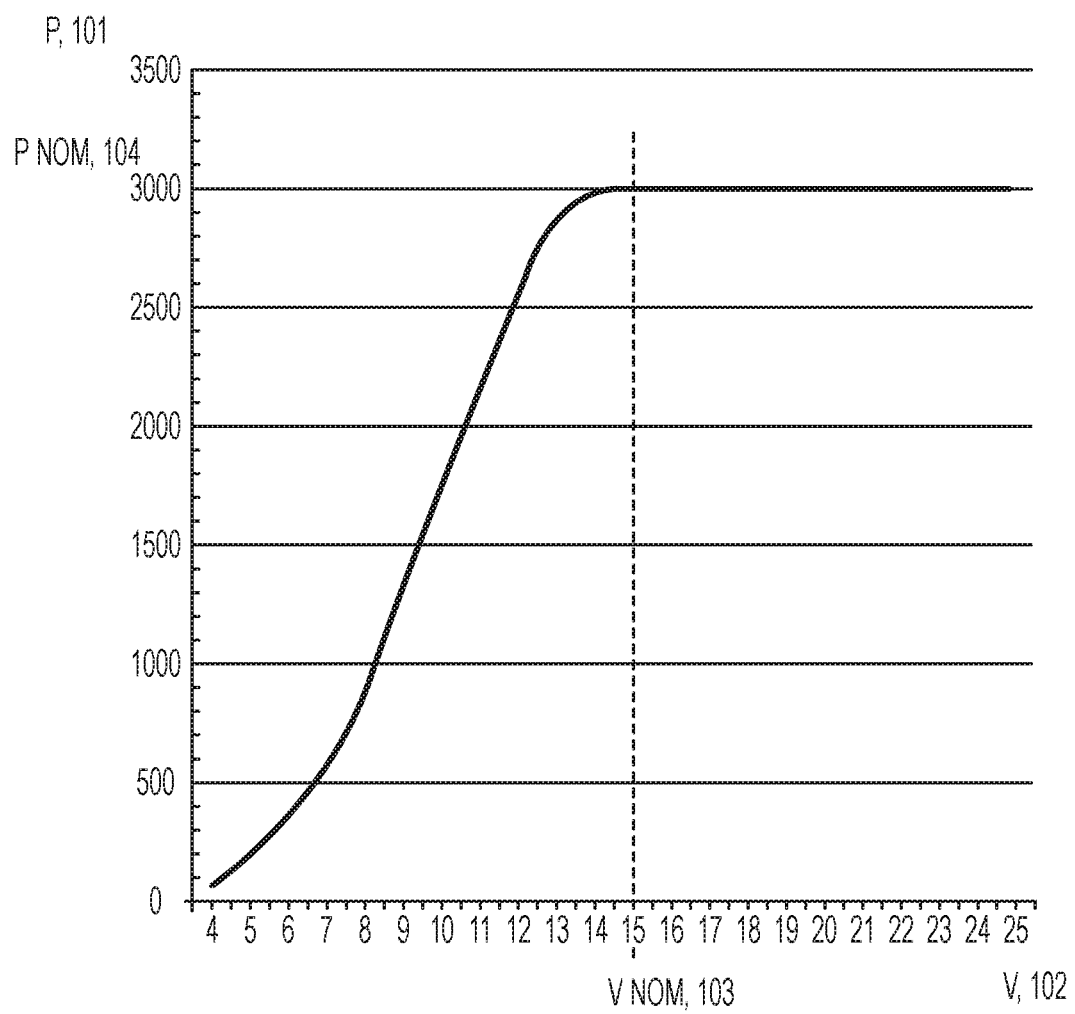
FIG. 1 shows an example of a conventional power curve during partial and full load operation.

FIG. 1 shows an example of a conventional or normal power curve with the power P, 101 shown as a function of the wind speed V, 102. At the lower wind speeds below the nominal wind speed $V_{nom}$, 103 and the nominal power $P_{nom}$, 104 (in this example a nominal wind speed of 15 m/s and a nominal power of 3000 kW) the wind turbine is under partial load operation where the wind turbine is controlled with a view to increase the power production. As can be seen from the FIG. 1, during partial load operation the power increases with increasing wind speeds until the nominal power of the wind turbine is reached. During full load operation at wind speeds above the nominal wind speed and/or when the power has reached the nominal power, the turbine is controlled by adjusting the pitch angles of the blades with a view to maintain the nominal power while reducing or controlling the loads on the turbine.

Generally, the wind turbine is therefore controlled according to partial load operation until a certain reference power is reached and the controlling is switched to full load operation. Most often the reference power is the same as the nominal power for the wind turbine but may under some conditions and in some situations like for example during unstable weather conditions, be reduced by a factor to increase the safety of the wind turbine. Likewise, the reference power may under some conditions be uprated by a factor for example during favourable weather conditions.

Figure 2:
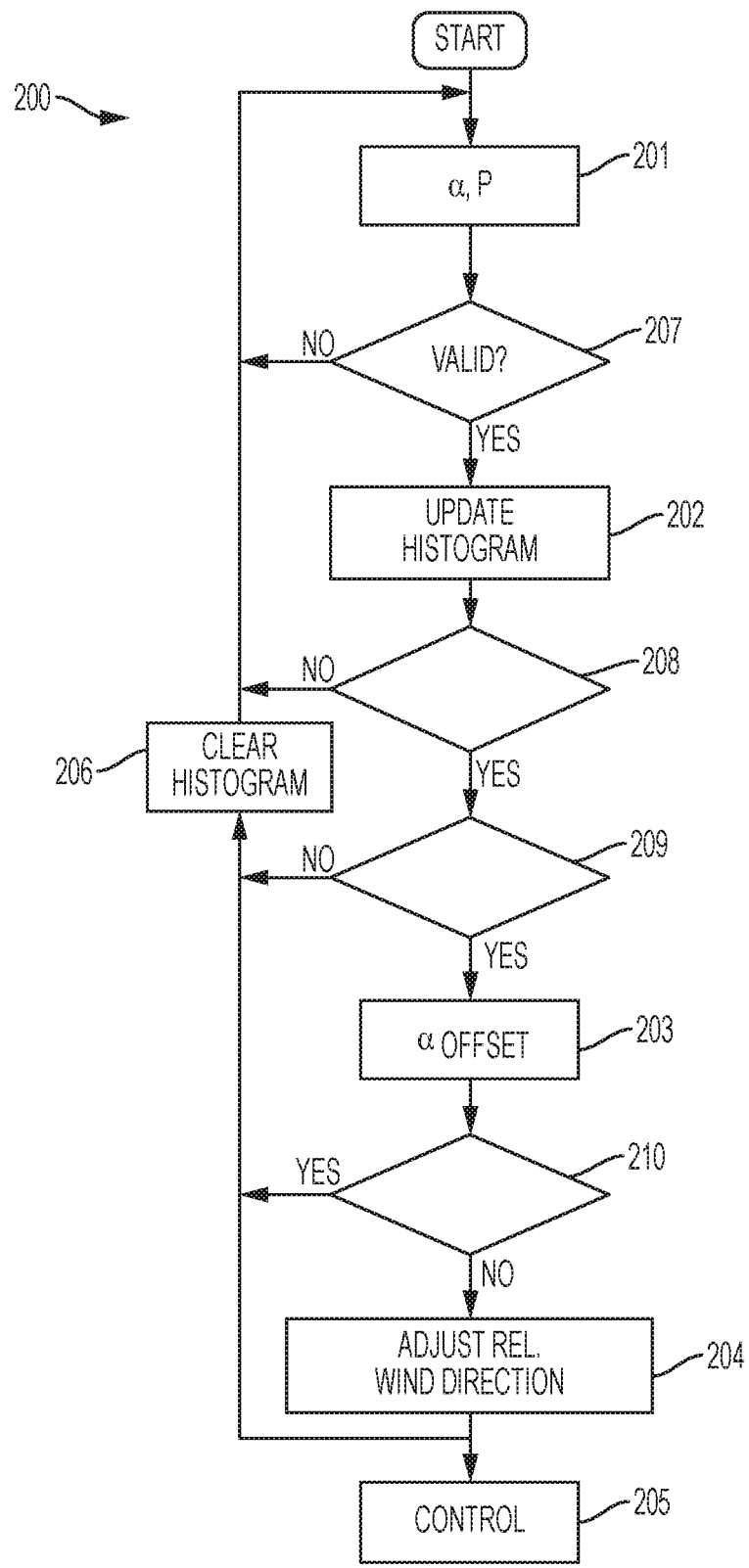
FIG. 2 is a flow chart illustrating embodiments of the invention.

FIG. 2 shows a flow chart illustrating the method steps performed in a control system, 200, of a wind turbine according to the invention. The control method comprises measuring a direction of the wind relative to the wind turbine by means of a wind direction sensor and a wind power parameter, 201. The wind power parameter may be for example determined as the power of the wind turbine (such as the grid power or the generator power), a torque (for example measured on the shaft), or a blade load of the wind turbine, which may be determined from strain gauges or other sensors on the blades or from the blade root moments. Preferably, the relative wind direction is initially adjusted according to a predefined set of wind direction correction parameters. This data forming a set is used in determining over time a statistical representation of the wind power parameter as a function of the relative wind direction, 202. The statistical representation may comprise a histogram over the average power, torque or blade load versus the relative wind direction updated as more data are obtained. From this statistical representation is then estimated a wind direction offset $\alpha_{offset}$ corresponding to the relative wind direction yielding a peak wind power parameter, 203. Examples of such determination are given in FIGS. 3-5. Then the relative wind direction as measured by the wind direction sensor is adjusted so that the peak of the wind power parameter is moved closer to a relative wind direction of 0 degrees, 204. The adjusted wind direction can then be used in determining control parameters and in controlling the wind turbine, for example in determining the desired yawing parameter for the wind turbine, 205. This method based on detecting the wind power parameter over time as a function of the measured relative wind direction yields an effective adjustment of the wind direction measurements preferably based on parameters detected during partial load operation of the wind turbine at lower wind speeds and power below nominal power.

The determination of the wind direction offset may be repeated at time intervals based on new and recollected sets of data, 206.

The determination of the wind direction offset and thereby the adjustment of the wind direction may be improved by sorting the data sets used in the statistical representation and disregard invalid data or data of lower quality, 207. For example a data set may be disregarded if the wind power parameter is outside a certain range. The control system may further include counting the number of samples or data sets at each relative wind direction, 208, thereby ensuring that the statistical representation is based on a certain minimum amount of data in different wind direction intervals. Also, the quality of the statistical representation may be further improved by checking before estimating the wind direction offset parameter that the overall shape of the histogram of the average wind power parameter as a function of the measured wind direction is as expected, 209.

Figure 3:
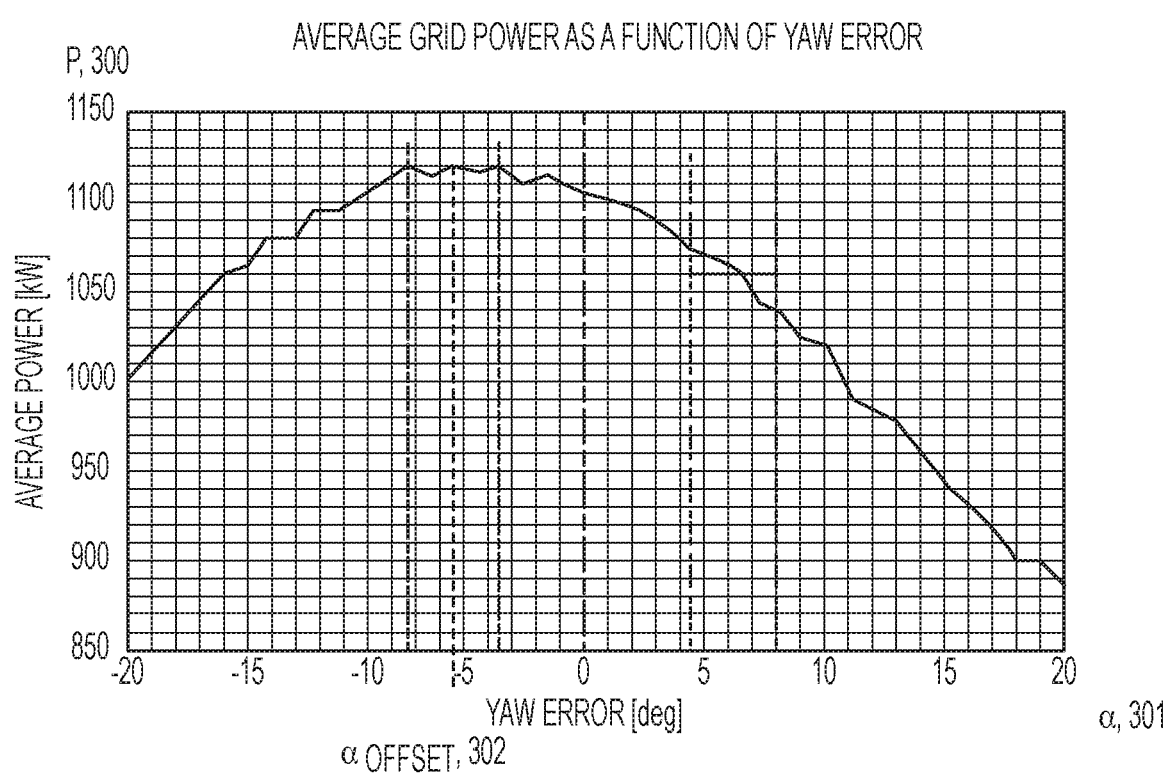
FIG. 3 shows a statistical representation of the average wind power as a function of the relative wind direction from which a wind direction offset can be determined according to an embodiment of the invention.

FIG. 3 shows an example of one such statistical representation of the grid power P, 300, at different measured relative wind directions, α, 301. From this is extracted that the grid power attains a maximum at a relative wind direction of −6 degrees as indicated by the arrow, 303. This is then estimated as the wind direction offset, 302. In a situation like this the measured relative wind direction will be adjusted correspondingly with 6 degrees, or at least an amount towards the 6 degrees.

Figure 4:
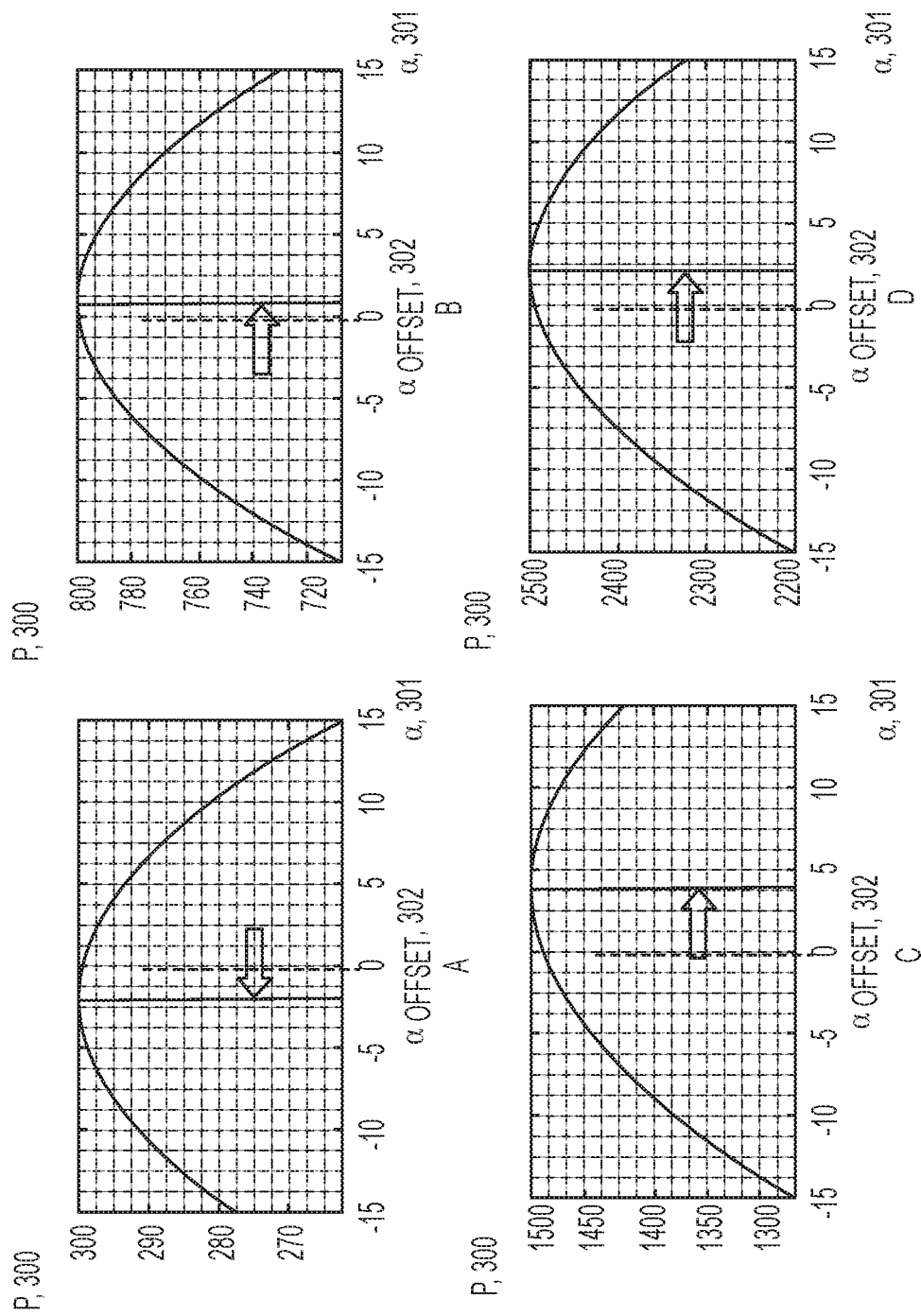
FIGS. 4 and 5A-D show four histograms and statistical representations of the average power vs measured relative wind direction at four different power intervals.
Figure 5:
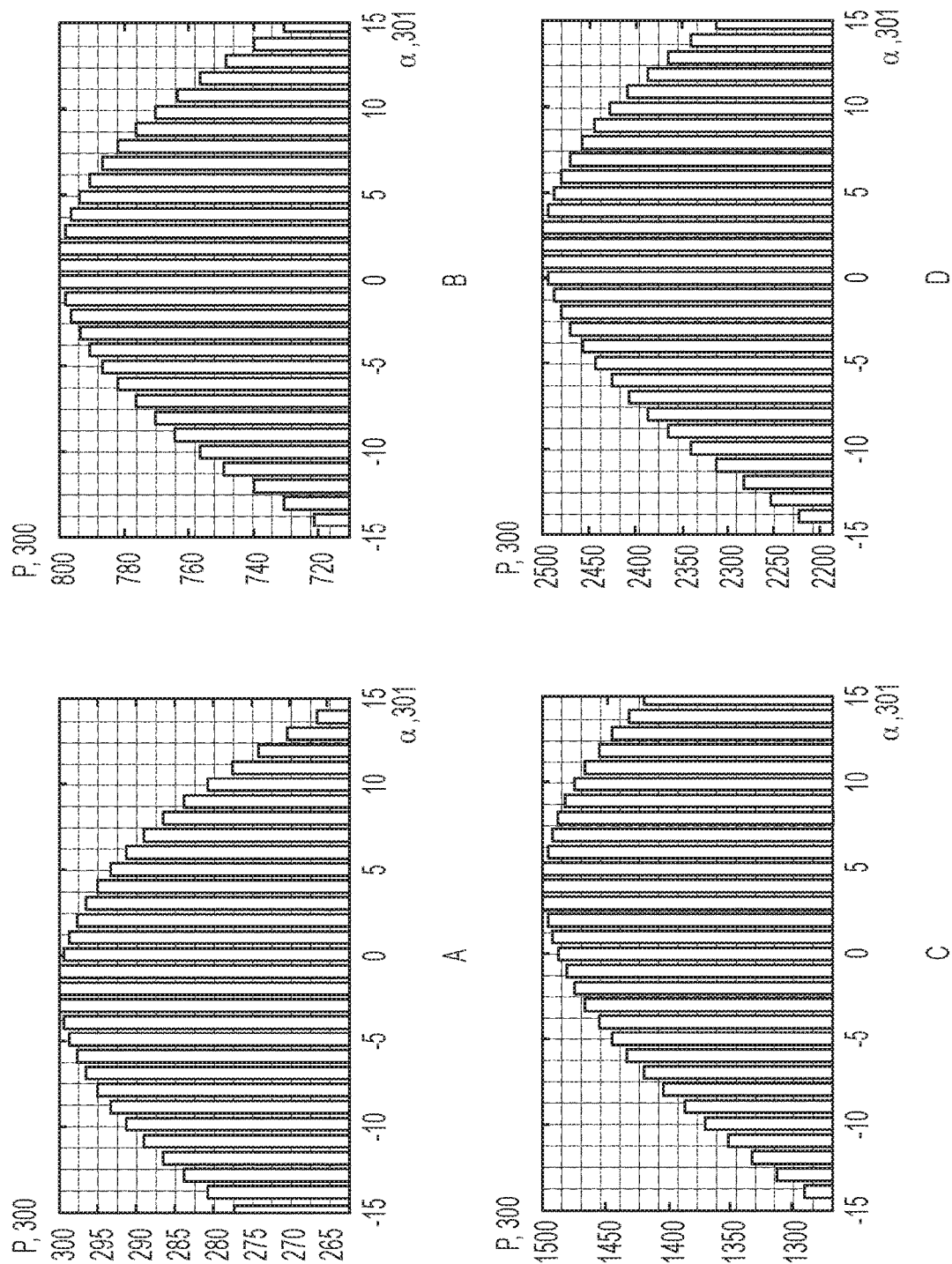

FIGS. 4 and 5 show an example where 4 different statistical representations have been determined at 4 different wind power bins or intervals as shown in A, B, C, and D. From each power bin is determined a wind direction offset parameter. Based on these measurements, the wind direction offset is determined as approximately −2 degrees for a power in the interval of 250-500 kW(FIG. 4A), as +1 degree for the power in the interval of 500-1000 kW(FIG. 4B), +4 degrees for the power in the interval of 1000-1800 KW(FIG. 4C), and +2 degrees in the last wind power parameter interval of 1000-2500 kW in FIG. 4D. These wind direction offsets are then used to adjust the relative wind direction depending on the power. It is noted, that the wind direction offset parameters are determined independently of the wind speed, which has been found to increase the accuracy of the wind direction correction. In FIG. 5A-D is shown the histograms built up as the data sets are collected, where FIG. 4A-D then show the resulting statistical representations from the histograms of FIG. 5.

Figure 6:
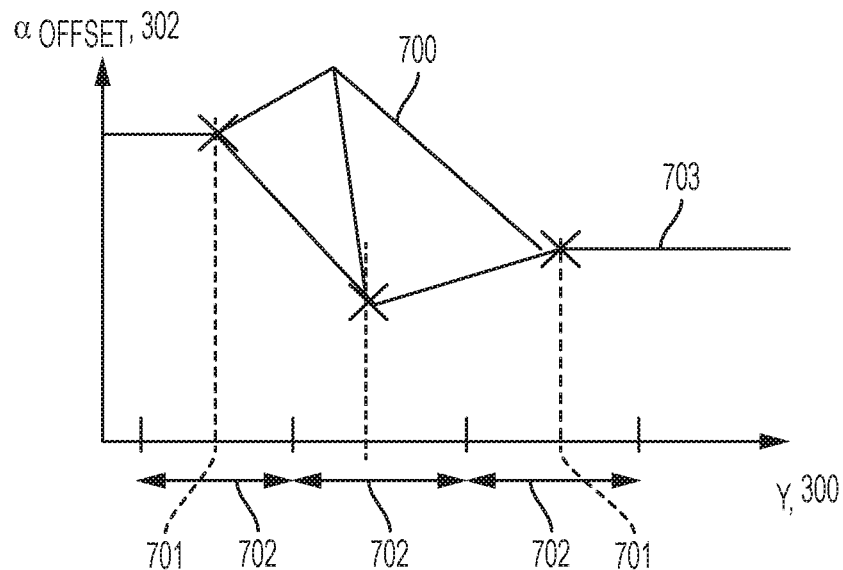
FIG. 6 illustrates the interpolation of different wind direction offset parameters.

This approach may be improved even further by interpolating between the wind direction offsets determined from the different wind power parameter intervals to thereby obtain interpolated values for the wind direction offset parameters. This is illustrated in FIG. 6. Here, the crosses 700 mark the determined wind direction offset parameters 302 as assigned to the average wind power parameter value 701 in each wind power parameter interval 702. The wind power parameter intervals 702 are indicated along the x-axis of the figure. The interpolation 703 between the points 700 yields the wind direction offset to be used as a function of the actual wind power parameter 300.

Figure 7:
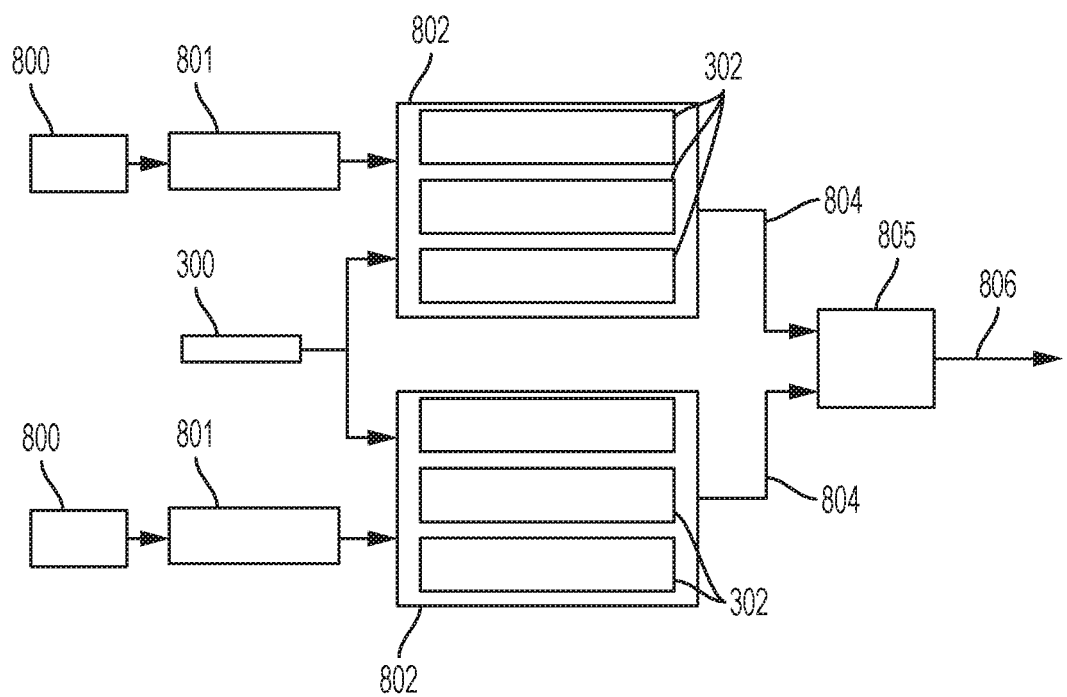
FIG. 7 illustrates the method according to embodiments of the invention applied on more wind direction sensor measurements.

Often, several wind direction sensors 800 are used on a wind turbine. In that case the wind direction measurements from each sensor 800 may be corrected individually by different sets of wind direction offset parameters, and the adjusted relative wind direction from each sensor then fused to yield a common final corrected relative wind direction to be applied in the control system of the wind turbine. This is illustrated in FIG. 7. Here, the wind direction measurements from two different sensors 800 are first each corrected or calibrated 801 based on pre-defined wind correction parameters. Then, the relative wind direction for each sensor is adjusted 802 based on the wind direction offset parameters 302 for the relevant wind power parameter bin or interval and as determined by the actual wind power parameter 300. The hereby adjusted relative wind directions 804 are then fused 805 to yield the final corrected relative wind direction 806. The sensor fusion 805 may simply be the average of the two input values. This may especially be the case as long as both sensors I and II (800) show no indications of failures or abnormal behaviour.

Fault detection and fault diagnosis may be performed of each of the sensors, and the more failures or abnormal behaviour a sensor show, the lower it will be weighted in the sensor fusion 805. In the event that both sensors show abnormal behaviour, the fusion may start to take into account previous sensor results as well.

The examples and embodiments described above are for example purposes only, and it will be appreciated that features of different embodiments may be combined with one another in any combination.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method of controlling a wind turbine, the wind turbine comprising a wind direction sensor, a yawing system, and a control system for turning the wind turbine rotor relative to the wind, the method comprising:
 pre-setting a number of intervals of a wind power parameter, the wind power parameter comprising one of: a power output, a torque on a main shaft, or a blade load of the wind turbine;
 obtaining, at time intervals, a data set comprising a direction of the wind relative to the wind turbine as measured by the wind direction sensor and the wind power parameter;
 obtaining a group of data sets for each wind power parameter interval;
 disregarding a data set from the group of data sets upon determining that a power output of the wind turbine is at or above a nominal power of the wind turbine;
 determining for each wind power parameter interval a statistical representation of the wind power parameter as a function of the relative wind direction based on the group of data sets for that interval, wherein the group of data sets does not include the disregarded data set;
 estimating for each wind power parameter interval and each statistical representation a wind direction offset of that interval, the wind direction offset corresponding to the relative wind direction where the wind power parameter attains a peak value;
 adjusting the relative wind direction as a function of the wind direction offset of the different wind power parameter intervals;
 determining a control parameter of the wind turbine as a function of the adjusted relative wind direction; and
 controlling the wind turbine according to the control parameter.

2. The method of claim 1, wherein the relative wind direction is adjusted as a function of the wind direction offset of the wind power parameter interval comprising the wind power parameter at the time of adjusting.

3. The method of claim 1, wherein the relative wind direction is adjusted by interpolation between the wind direction offsets of the wind power parameter intervals.

4. The method of claim 1, wherein the statistical representations are determined independently of the wind speed.

5. The method of claim 1, further comprising:
 disregarding another data set from the group of data sets upon determining that a power output of the wind turbine is lower than a wind power threshold.

6. The method of claim 5, wherein the wind power threshold corresponds to a factor times a nominal power of the wind turbine, wherein the factor is between the range of 0.05-0.2.

7. The method of claim 1, wherein the statistical representation of a wind power parameter interval is determined over a predetermined time period.

8. The method of claim 1, wherein the statistical representation of a wind power parameter interval is determined based on a predetermined number of data sets in the group of data sets for that wind power parameter interval.

9. The method of claim 1, wherein the statistical representation of a wind power parameter interval is determined based on at least a predetermined number of data sets within at least one predetermined interval of relative wind direction.

10. The method of claim 1, wherein the obtaining of a data set and the determining of a statistical representation are repeated at time intervals.

11. The method of claim 1, wherein determining the blade load comprises determining a root moment of one or more of the wind turbine blades along a rotational axis of the blades.

12. The method of claim 1, wherein the adjusting of the relative wind direction comprises reducing the wind direction offset by a gain factor smaller than one, wherein the gain factor is in the interval of 0.1-0.95.

13. The method of claim 1, wherein the relative wind direction is further adjusted as a function of earlier wind direction offsets.

14. The method of claim 1, further comprising:
correcting the relative wind direction as measured by the wind direction sensor according to a predefined set of wind correction parameters.

15. The method of claim 1, wherein the control parameter comprises a yaw angle for the wind turbine and the controlling of the wind turbine comprises yawing the wind turbine according to the control parameter.

16. A control system for a wind turbine, comprising:
a wind direction sensor;
a yawing system; and
a controller communicatively coupled to the wind direction sensor and yawing system; the controller configured to perform an operation, comprising:
pre-setting a number of intervals of a wind power parameter, the wind power parameter comprising one of: a power output, a torque on a main shaft, or a blade load of the wind turbine;
obtaining, at time intervals, a data set comprising a direction of the wind relative to the wind turbine as measured by the wind direction sensor and the wind power parameter;
obtaining a group of data sets for each wind power parameter interval;
disregarding a data set from the group of data sets upon determining that a power output of the wind turbine is at or above a nominal power of the wind turbine;
determining for each wind power parameter interval a statistical representation of the wind power parameter as a function of the relative wind direction based on the group of data sets for that wind power parameter interval, wherein the group of data sets does not include the disregarded data set;
estimating for each wind power parameter interval and each statistical representation a wind direction offset of that wind power parameter interval, the wind direction offset corresponding to the relative wind direction where the wind power parameter attains a peak value;
adjusting the relative wind direction as a function of the wind direction offset of the different wind power parameter intervals;
determining a control parameter of the wind turbine as a function of the adjusted relative wind direction; and
controlling the wind turbine according to the control parameter.

17. A wind turbine, comprising:
a tower;
a nacelle disposed on the tower;
a wind direction sensor;
a yawing system disposed in the nacelle; and
a controller communicatively coupled to the wind direction sensor and yawing system; the controller configured to perform an operation, comprising:
pre-setting a number of intervals of a wind power parameter, the wind power parameter comprising one of: a power output, a torque on a main shaft, or a blade load of the wind turbine;
obtaining, at time intervals, a data set comprising a direction of the wind relative to the wind turbine as measured by the wind direction sensor and the wind power parameter;
obtaining a group of data sets for each wind power parameter interval;
disregarding a data set from the group of data sets upon determining that a power output of the wind turbine is at or above a nominal power of the wind turbine;
determining for each wind power parameter interval a statistical representation of the wind power parameter as a function of the relative wind direction based on the group of data sets for that wind power parameter interval, wherein the group of data sets does not include the disregarded data set;
estimating for each wind power parameter interval and each statistical representation a wind direction offset of that wind power parameter interval, the wind direction offset corresponding to the relative wind direction where the wind power parameter attains a peak value;
adjusting the relative wind direction as a function of the wind direction offset of the different wind power parameter intervals;
determining a control parameter of the wind turbine as a function of the adjusted relative wind direction; and
controlling the wind turbine according to the control parameter.

* * * * *